US010015176B2

(12) United States Patent
Bratspiess et al.

(10) Patent No.: US 10,015,176 B2
(45) Date of Patent: Jul. 3, 2018

(54) NETWORK PROTECTION

(71) Applicant: CYBERSEAL LTD., Yehud-Monosson (IL)

(72) Inventors: Iftah Bratspiess, Tel Aviv (IL); Yosef Appleboum, Tel Mond (IL); Bentsi Ben-Atar, Ness Ziona (IL); Gilad Bandel, Kiryat Ono (IL)

(73) Assignee: CYBERSEAL LTD., Yehud-Monosson (IL)

( * ) Notice: Subject to any disclaimer, the term of this patent is extended or adjusted under 35 U.S.C. 154(b) by 0 days.

(21) Appl. No.: 14/904,983

(22) PCT Filed: Jul. 15, 2014

(86) PCT No.: PCT/IL2014/050638
§ 371 (c)(1),
(2) Date: Jan. 14, 2016

(87) PCT Pub. No.: WO2015/008282
PCT Pub. Date: Jan. 22, 2015

(65) Prior Publication Data
US 2016/0173511 A1    Jun. 16, 2016

Related U.S. Application Data

(60) Provisional application No. 61/846,188, filed on Jul. 15, 2013.

(51) Int. Cl.
*H04L 29/06* (2006.01)
*H04L 12/24* (2006.01)
*G05B 23/02* (2006.01)

(52) U.S. Cl.
CPC ........ *H04L 63/1416* (2013.01); *H04L 41/145* (2013.01); *H04L 63/00* (2013.01);
(Continued)

(58) Field of Classification Search
CPC .................................................. H04L 63/1416
See application file for complete search history.

(56) References Cited

U.S. PATENT DOCUMENTS 7,289,857 B2   10/2007   Nauck et al.
7,978,090 B2    7/2011   Brooks et al.
(Continued)

FOREIGN PATENT DOCUMENTS

CN    101253723 A    8/2008
EA      013885 B1    8/2010
(Continued)

*Primary Examiner* — Shawnchoy Rahman
(74) *Attorney, Agent, or Firm* — The Roy Gross Law Firm, LLC; Roy Gross

(57) ABSTRACT

A network security system for a network, the network comprising a plurality of networked appliances, the security system comprising one or more security devices, wherein each security device of the one or more security devices is associated with one or more networked security appliances of the plurality of networked security appliances, and wherein each security device comprises: a network interface comprising one or more ports, wherein each networked security appliance of the one or more networked security appliances associated with the security device is operatively coupled with the security device via a different port of the ports; at least one processor configured to: upon initial setup of said security device, create a baseline profile of an activity of the network, and following an activation of a protection mode, identify an irregular event by detecting a deviation of network traffic passing through a port of the ports from said baseline profile.

19 Claims, 2 Drawing Sheets

(52) U.S. Cl.
CPC ...... *H04L 63/0209* (2013.01); *H04L 63/1441* (2013.01); *H04L 63/20* (2013.01); *G05B 23/0235* (2013.01); *H04L 41/12* (2013.01)

(56) References Cited

U.S. PATENT DOCUMENTS

| | | | |
|---|---|---|---|
| 8,098,658 B1* | 1/2012 | Ranganathan | H04L 45/00 370/254 |
| 2004/0059815 A1* | 3/2004 | Buckingham | H04L 12/2803 709/224 |
| 2004/0190547 A1* | 9/2004 | Gordy | H04L 63/02 370/463 |
| 2005/0193429 A1 | 9/2005 | Demopoulos et al. | |
| 2006/0195201 A1 | 8/2006 | Nauck et al. | |
| 2007/0120668 A1 | 5/2007 | Boyd et al. | |
| 2009/0273472 A1 | 11/2009 | Brooks et al. | |
| 2013/0127618 A1 | 5/2013 | Sheleheda et al. | |
| 2013/0129149 A1* | 5/2013 | Nandakumar | G06Q 30/0276 382/104 |
| 2013/0347062 A1* | 12/2013 | Matityahu | H04L 43/12 726/1 |
| 2014/0159895 A1* | 6/2014 | Bleisch | G08B 25/004 340/539.14 |

FOREIGN PATENT DOCUMENTS

| | | |
|---|---|---|
| JP | 2002123434 A | 4/2002 |
| JP | 2004086880 A | 3/2004 |
| JP | 3113937 U | 9/2005 |
| JP | 2006244141 A | 9/2006 |
| KR | 20040021926 A | 3/2004 |
| WO | 2010056379 A1 | 5/2010 |
| WO | 2012135103 A2 | 10/2012 |
| WO | 2012174845 A1 | 12/2012 |
| WO | 2013100433 A1 | 7/2013 |
| WO | 2014009726 A1 | 1/2014 |

\* cited by examiner

NETWORK PROTECTION

BACKGROUND

The present invention relates to the field of network security.

There are many new hazards that result from institutions' use of a growing number of physical security elements. Surveillance cameras, access control systems, sensor and controller are all connected using TCP/IP (Transmission Control Protocol/Internet Protocol) and networking technology and rely on unsecure communication networks that are laid across the site and in the field. The use of these unsecure networks exposes the site to combined cyber and physical attacks.

Cyber security is an evident threat to any organization. Providing both security and connectivity creates a conflicting case in the computing and networking arena of many enterprises and organization such as homeland security, safe city, utilities, industrial, transportation, etc. The typical network architecture consists of multiple network appliances connected through a network infrastructure providing a large set of services to the users and organization. Having a reliable and consistent network is a top priority item for any organization worldwide.

U.S. Patent Application Publication No. 20050193429 to Demopoulos et al. discloses an integrated data traffic monitoring system monitoring data traffic received from a communication network and destined for a protected network. The monitoring system includes a security appliance and one or more security and monitoring technologies such as hardware and open source and proprietary software products. The security appliance and the security and monitoring technologies may be implemented as separate and distinct modules or combined into a single security appliance. The security and monitoring technologies monitor network data traffic on, or directed to, the protected network. The monitoring system collects data from each of the technologies into an event database and, based on the data, automatically generates rules directing one or more of the technologies to prevent subsequent communications traffic from specific sources from entering the protected network.

U.S. Patent Application Publication No. 2013127618 to Sheleheda et al. discloses a method, non-transitory computer readable medium and apparatus for providing network security monitoring in a communications network are disclosed. For example, the method receives communications traffic associated with a sensor network from a sensor that is a member of the sensor network, analyzes the communications traffic to determine if an attack is occurring on the sensor network, and generates an alarm if the attack is occurring on the sensor network.

Japanese Patent Application Publication No. 2004086880 to Atsou discloses a system for detecting illegal access at respective connection points and notifying warning information, a means for storing the notified warning information, a monitor for extracting access state of the network from communication contents at every connection point, and a means for storing the extracted access state. Additionally, it comprises a gate node provided to every connection point and executing access control, a system for analyzing and notifying invasion path of the detected illegal access on the basis of the stored access state and warning information, a means for generating an access control rule at the gate node on the basis of the analyzed invasion path and the warning information, and a means for distributing it to the gate node.

Japanese Patent Application Publication No. 206244141 to Seiji discloses a system with a plurality of sensors for monitoring unauthorized access to a network by checking a packet on the network and generating unauthorized access information when the unauthorized access is detected, and a management device for collectively managing the plurality of the sensors and monitoring the unauthorized access to the network based on the unauthorized access information. The management device is provided with a storing part wherein management tables grouped in accordance with attributes of the plurality of the sensors are stored, and collectively transmits signature information required for monitoring the unauthorized access to the sensor belonging to the identical group based on the management table, and the plurality of the sensors monitor the unauthorized access based on the signature information.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a network security system for a network, the network comprising a plurality of networked appliances, the security system comprising one or more security devices, wherein each security device of the one or more security devices is associated with one or more networked security appliances of the plurality of networked security appliances, and wherein each security device comprises: a network interface comprising one or more ports, wherein each networked security appliance of the one or more networked security appliances associated with the security device is operatively coupled with the security device via a different port of the ports; at least one hardware processor configured to: upon initial setup of said security device, create a baseline profile of an activity of the network, and following an activation of a protection mode, identify an irregular event by detecting a deviation of network traffic passing through a port of the ports from said baseline profile.

There is provided, in accordance with another embodiment, a security device for protecting a network, the network comprising a plurality of networked appliances, the security device comprising: a network interface comprising one or more ports, wherein each of one or more networked appliances of the plurality of networked appliances is operatively coupled with the security device via a different port of the ports; at least one hardware processor configured to: upon initial setup of said security device, create a baseline profile of an activity of the network, and following an activation of a protection mode, identify an irregular event by detecting a deviation of traffic of the network passing through a port of the ports from said baseline profile.

There is provided, in accordance with a further embodiment, a method for protecting a network, the network comprising a plurality of networked appliances, wherein each of said plurality of networked appliances is operatively coupled with a different port of a plurality of ports, the method comprising using at least one hardware processor for: initially creating a baseline profile of an activity of the network; and following an activation of a protection mode, identifying an irregular event by detecting a deviation of traffic of the network passing through a port of the plurality of ports from said baseline profile.

There is provided, in accordance with yet another embodiment, a computer program product for protecting a network, the network comprising a plurality of networked appliances, wherein each of said plurality of networked appliances is operatively coupled with a different port of a plurality of ports, the computer program product comprising a non-transitory computer-readable storage medium having program code embodied therewith, the program code executable by at least one hardware processor to: in an initial mode, create a baseline profile of an activity of the network; and following an activation of a protection mode, identify an irregular event by detecting a deviation of traffic of the network passing through a port of the plurality of ports from said baseline profile.

In some embodiments, upon the identification of an irregular event, said at least one hardware processor is further configured to take at least one action to protect the network.

In some embodiments, the at least one action is selected from the group consisting of: generating an event log, issuing an alert, disabling the port, logging off the irregular event, performing a counter attack, blocking the communication from or to one or more network appliances of the plurality of network appliances, and sending data with respect to the irregular event for further analysis in an external dedicated system.

In some embodiments, at least one network appliance of the plurality of network appliances is coupled with a port of the ports by an optical fiber, the baseline profile includes the length of the optical fiber, and the ports comprise Small form-Factor Pluggable transceivers (SFPs) equipped with Optical Time Domain Reflectometers (OTDRs), wherein the SFPs are used to monitor the optical fiber for reflections, and wherein the reflections represent a length of the optical fiber.

In some embodiments, at least one network appliance of the plurality of network appliances is coupled with a port of the ports by an optical fiber, the baseline profile includes an attenuation of the optical fiber, and the ports comprise SFPs equipped with OTDRs, wherein the SFPs are queried for the power received from the optical fiber, and wherein a change in the power received from the optical fiber indicates of a change in the attenuation of the optical fiber.

In some embodiments, the ports comprise at least one electrical port, at least one network appliance of the plurality of network appliances is coupled with the electrical port by an electrical cable, the baseline profile includes a length and a state of the electrical cable, and the hardware processor is further configured to monitor the electrical port for the length and state of the electrical cable.

In some embodiments, the ports comprise one or more ports with a power supply support; a network appliance of the plurality of network appliances is coupled with a port with power supply support of the one or more ports with a power supply support, wherein the port with power supply support supplies power to the network appliance, the baseline profile includes a power usage of the network appliance, and the hardware processor is further configured to monitor the port with a power supply support for the power usage of the network appliance.

In some embodiments, a security device of the one or more security devices further comprises a network port configured to couple the one or more network appliances associated with the security device with the network, the baseline profile includes characteristics of the plurality of network appliances, and the hardware processor is further configured to: (i) select one or more ports from the ports of the security device, and (ii) monitor the traffic of the network passing through the selected one or more ports for inbound traffic generated by network appliances of the one or more network appliances coupled with a the selected one or more ports indicative of the characteristics of the network appliances.

In some embodiments, the hardware processor is further configured to acquire a portion of the traffic of the network passing through each port of the selected one or more ports, wherein the monitoring in each port of the selected one or more ports is performed with respect to the acquired portion of the traffic.

In some embodiments, a security device of the one or more security devices further comprises a network port configured to couple the one or more network appliances associated with the security device with the network, the baseline profile includes a list of allowed network flows, and the hardware processor is further configured to: (i) select one or more ports from the ports, and (ii) monitor each selected one or more ports for network flows in inbound and outbound traffic generated by network appliances coupled with the selected ports.

In some embodiments, the hardware processor is further configured to acquire a portion of the traffic of the network passing through each port of the selected one or more ports, wherein the monitoring in each port of the selected one or more ports is performed with respect to the acquired portion of the traffic.

In some embodiments, at least one security device of the one or more security devices further comprises a push button configured to control the remote management and configuration of the at least one security device.

In some embodiments, the network security system further comprises a first security device and a second security device coupled with an optical fiber at two opposing sides of the optical fiber, and wherein: the first security device is designated as a master and performs policy enforcement on the network, and the second security device is designated as a slave and is configured to: perform measurements on the network traffic, and relay the measurements to the first security device.

In some embodiments, upon the identification of an irregular event, said at least one hardware processor is further configured to take at least one action to protect the network.

In some embodiments, the action is selected from the group consisting of: generating an event log, issuing an alert, disabling the port, logging off the irregular event, performing a counter attack, blocking the communication from or to one or more network appliances of the plurality of network appliances, and sending data with respect to the irregular event for further analysis in an external dedicated system.

In some embodiments, at least one network appliance of the plurality of network appliances is coupled with a port of the ports by an optical fiber, and the baseline profile includes the length of the optical fiber, and wherein the ports comprise SFPs equipped with Optical Time Domain Reflectometers (OTDRs), wherein the SFPs are used to monitor the optical fiber for reflections, and wherein the reflections represent a length of the optical fiber.

In some embodiments, at least one network appliance of the plurality of network appliances is coupled with a port of the ports by an optical fiber, and the baseline profile includes an attenuation of the optical fiber, and wherein the ports comprise SFPs equipped with OTDRs, wherein the SFPs are queried for the power received from the optical fiber, and wherein a change in the power received from the optical fiber indicated of a change in the attenuation of the optical fiber.

In some embodiments, the ports comprise at least one electrical port, at least one network appliance of the plurality of network appliances is coupled with the electrical port by an electrical cable, the baseline profile includes a length and a state of the electrical cable, and the hardware processor is further configured to monitor the electrical port for the length and state of the electrical cable.

In some embodiments, the ports comprise one or more ports with a power supply support; a network appliance of the plurality of network appliances is coupled with a port with power supply support of the one or more ports with a power supply support, the port with power supply support supplies power to the network appliance, the baseline profile includes a power usage of the network appliance, and the hardware processor is further configured to monitor the port with a power supply support for the power usage of the network appliance.

In some embodiments, the security device further comprises a network port configured to couple the one or more network appliances associated with the security device with the network, wherein: the baseline profile includes characteristics of the plurality of network appliances, and the hardware processor is further configured to: (i) select one or more ports from the ports, and (ii) monitor the traffic of the network passing through the selected one or more ports for inbound traffic generated by network appliances of the plurality of network appliances coupled with the selected one or more ports indicative of the characteristics of the network appliances.

In some embodiments, the hardware processor is further configured to acquire a portion of the traffic of the network passing through each port of the selected one or more ports, wherein the monitoring of the traffic of the network passing through each port of the selected one or more ports is performed with respect to the acquired portion of the traffic.

In some embodiments, the security device further comprises a network port configured to couple the plurality of network appliances associated with the security device with the network, wherein: the baseline profile includes a list of allowed network flows, and the hardware processor is further configured to: (i) select one or more ports from the ports, and (ii) monitor each selected one or more ports for network flows in inbound and outbound traffic generated by network appliances of the plurality of network appliances coupled with the selected ports.

In some embodiments, the hardware processor is further configured to acquire a portion of the traffic of the network passing through each port of the selected one or more ports, wherein the monitoring of the traffic of the network passing through each port of the selected one or more ports is performed with respect to the acquired portion of the traffic.

In some embodiments, the security device further comprises a push button configured to control the remote management and configuration of the security device.

In some embodiments, the method further comprises using said at least one hardware processor for taking at least one action to protect the network upon the identification of an irregular event.

In some embodiments, the action is selected from the group consisting of: generating an event log, issuing an alert, disabling the port, logging off the irregular event, performing a counter attack, blocking the communication from or to one or more network appliances of the plurality of network appliances, and sending data with respect to the irregular event for further analysis in an external dedicated system.

In some embodiments, at least one network appliance of the plurality of network appliances is coupled with a port of the ports by an optical fiber, the baseline profile includes the length of the optical fiber, and the ports further comprise SFPs equipped with Optical Time Domain Reflectometers (OTDRs), and wherein the method further comprises using said at least one hardware processor for utilizing the SFPs to monitor the optical fiber for reflections, and wherein the reflections represent a length of the optical fiber.

In some embodiments, at least one network appliance of the plurality of network appliances is coupled with a port of the ports by an optical fiber, the baseline profile includes an attenuation of the optical fiber, and the ports further comprise SFPs equipped with OTDRs, and wherein the method further comprises using said at least one hardware processor for querying SFPs for the power received from the optical fiber, and wherein a change in the power received from the optical fiber indicated of a change in the attenuation of the optical fiber.

In some embodiments, the ports comprise at least one electrical port, at least one network appliance of the plurality of network appliances is coupled with the electrical port by an electrical cable, the baseline profile includes a length and a state of the electrical cable, and wherein the method further comprises using said at least one hardware processor for monitoring the electrical port for the length and state of the electrical cable.

In some embodiments, the ports comprise one or more ports with a power supply support; a network appliance of the plurality of network appliances is coupled with a port with power supply support of the one or more ports with a power supply support, wherein the port with power supply support supplies power to the network appliance, and the baseline profile includes a power usage of the network appliance, and wherein the method further comprises using said at least one hardware processor for monitoring the port with a power supply support for the power usage of the network appliance.

In some embodiments, the ports comprise a network port configured to couple the plurality of network appliances with the network, and the baseline profile includes characteristics of the plurality of network appliances, and wherein the method further comprises using said at least one hardware processor for: (i) selecting one or more ports from the ports, and (ii) monitoring each selected one or more ports for inbound traffic generated by one or more network appliances of the plurality of network appliances coupled with the selected one or more ports indicative of the characteristics of the one or more network appliances.

In some embodiments, the method further comprises using said at least one hardware processor for acquiring a portion of the traffic of the network passing through each port of the selected one or more ports, wherein the monitoring of the inbound traffic generated by the one or more network appliances is performed with respect to the acquired portion of the traffic.

In some embodiments, the ports comprise a network port configured to couple the plurality of network appliances with the network, and the baseline profile includes a list of allowed network flows, and wherein the method further comprises using said at least one hardware processor for: (i) selecting one or more ports from the ports, and (ii) monitoring each selected one or more ports for network flows in inbound and outbound traffic generated by one or more network appliances of the plurality of network appliances coupled with the selected one or more ports.

In some embodiments, the method further comprises using said at least one hardware processor for acquiring a portion of the traffic of the network passing through each port of the selected one or more ports, wherein the monitoring of the inbound traffic generated by the one or more network appliances is performed with respect to the acquired portion of the traffic.

In some embodiments, the method further comprises using said at least one hardware processor for controlling the remote management and configuration of the ports.

In some embodiments, the program code is further executable by the at least one hardware processor to take at least one action to protect the network upon the identification of an irregular event.

In some embodiments, the action is selected from the group consisting of: generating an event log, issuing an alert, disabling the port, logging off the irregular event, performing a counter attack, blocking the communication from or to one or more network appliances of the plurality of network appliances, and sending data with respect to the irregular event for further analysis in an external dedicated system.

In some embodiments, at least one network appliance of the plurality of network appliances is coupled with a port of the ports by an optical fiber, the baseline profile includes the length of the optical fiber, and the ports further comprise SFPs equipped with OTDRs, and wherein the program code is further executable by the at least one hardware processor to utilize the SFPs to monitor the optical fiber for reflections, and wherein the reflections represent a length of the optical fiber.

In some embodiments, at least one network appliance of the plurality of network appliances is coupled with a port of the ports by an optical fiber, the baseline profile includes an attenuation of the optical fiber, and the ports further comprise SFPs equipped with OTDRs, and wherein the program code is further executable by the at least one hardware processor to query SFPs for the power received from the optical fiber, and wherein a change in the power received from the optical fiber indicates of a change in the attenuation of the optical fiber.

In some embodiments, the ports comprise at least one electrical port, at least one network appliance of the plurality of network appliances is coupled with the electrical port by an electrical cable, the baseline profile includes a length and a state of the electrical cable, and wherein the program code is further executable by the at least one hardware processor to monitor the electrical port for the length and state of the electrical cable.

In some embodiments, the ports comprise one or more ports with a power supply support; a network appliance of the plurality of network appliances is coupled with a port with power supply support of the one or more ports with a power supply support, wherein the port with power supply support supplies power to the network appliance, and the baseline profile includes a power usage of the network appliance, and wherein the program code is further executable by the at least one hardware processor to monitor the port with a power supply support for the power usage of the network appliance.

In some embodiments, the ports comprise a network port configured to couple the plurality of network appliances with the network, and the baseline profile includes characteristics of the plurality of network appliances, and wherein the program code is further executable by the at least one hardware processor to: (i) select one or more ports from the ports, and (ii) monitor each selected one or more ports for inbound traffic generated by one or more network appliances of the plurality of network appliances coupled with the selected one or more ports indicative of the characteristics of the one or more network appliances.

In some embodiments, the program code is further executable by the at least one hardware processor to: acquire a portion of the traffic of the network passing through each port of the selected one or more ports, wherein the monitoring of the inbound traffic generated by the one or more network appliances is performed with respect to the acquired portion of the traffic.

In some embodiments, the ports comprise a network port configured to couple the plurality of network appliances with the network, and the baseline profile includes a list of allowed network flows, and wherein the program code is further executable by the at least one hardware processor to: (i) select one or more ports from the ports, and (ii) monitor each selected one or more ports for network flows in inbound and outbound traffic generated by one or more network appliances of the plurality of network appliances coupled with the selected one or more ports.

In some embodiments, the program code is further executable by the at least one hardware processor to: acquire a portion of the traffic of the network passing through each port of the selected one or more ports, wherein the monitoring of the inbound traffic generated by the one or more network appliances is performed with respect to the acquired portion of the traffic.

In some embodiments, the program code is further executable by the at least one hardware processor to control the remote management and configuration of the ports.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

The disclosed network protection may provide an integrated protection in the physical and cyber domains by inspecting detected physical and cyber related events and taking actions accordingly. Based on a configured set of rules, actions such as generating events, generating alarms and disabling ports or other network elements may be performed. The actions may be taken to prevent unwanted effects or damages to the network and preventing illegal communication attempts between network elements. The disclosed network protection is easily managed and may provide high flexibility, which may allow, for example, numerous alterations and/or significant network expansion without reducing the network protection. Thus, in such cases, the network protection may be accordingly altered and/or expanded in a simple and easy manner.

The terms "network traffic" and "traffic of a network" as referred to herein, may relate to any type of data that may be received, sent or transferred via the network, including messages, power received from optical fibers of the network, power usage of a network appliance, reflections of optical fibers of the network and/or network flows.

The terms "read" and "measure" and their deviations may be used herein below interchangeably. The terms "abnormal" and "irregular" and their deviations may be used herein below interchangeably. The terms "protect" and "secure" and their deviations may be used herein below interchangeably.

Figure 1:
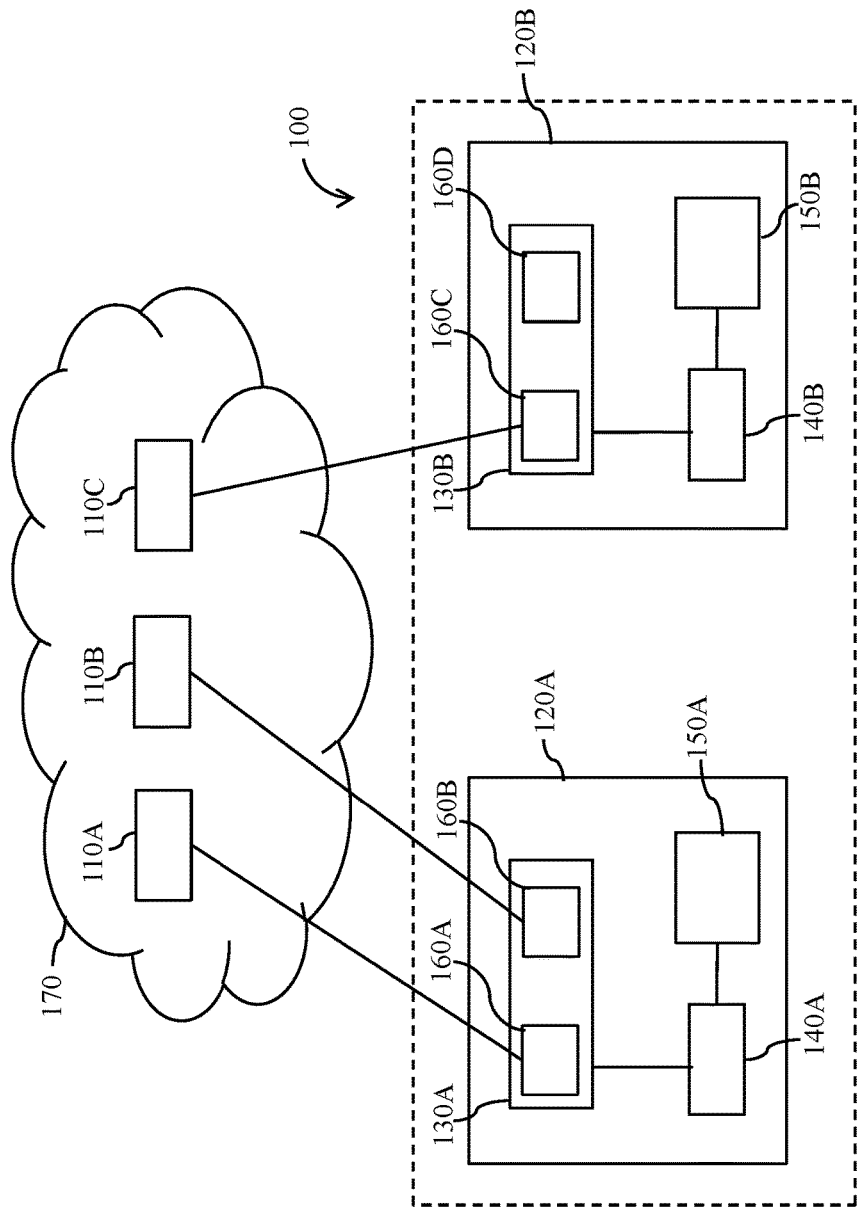
FIG. 1 shows an exemplary network security system coupled with an exemplary network.

Reference is now made to FIG. 1, which shows an exemplary network security system 100 coupled with an exemplary network 170. Network security system 100 (or simply system 100) may include two security devices 120A and 120B. Network security system 100 may be coupled with network 170 for the purpose of protecting network 170 against physical and cyber-attacks. Network 170 may include network appliances 110A-110C.

Security devices 120A and 120B may include network interfaces 130A and 130B, correspondingly, and hardware processors 140A and 140B, correspondingly. Security devices 120A and 120B may further include storage devices 150A and 150B, correspondingly. Network interface 130A may include ports 160A and 160B. Network interface 130B may include ports 160C and 160D.

Each of networked security appliances 110A-110C may be operatively coupled with one of security devices 120A and 120B. Thus, network appliance 110A may be operatively coupled with security device 120A via port 160A; network appliance 110B may be operatively coupled with security device 120A via port 160B; and network appliance 110C may be operatively coupled with security device 120B via port 160C. Hardware processors 140A and 140B may be configured to perform measurements on the traffic of network 170 passing through ports 160A, 160B and 160C. Each of network interfaces 130A and 130B and storage devices 150A and 150B may be operatively coupled with one of hardware processors 140A and 140B, correspondingly.

Networked security appliances 110A-110C may be coupled with ports 160A, 160B and 160C through conductive media, such as optical fibers or electrical cables (e.g., copper cables) or through radiative media such as Wireless Fidelity (Wi-Fi), cellular communication, Bluetooth etc.

Networked security appliances 110A-110C may be, for example, computers, cameras, sensors, Wireless Fidelity (Wi-Fi) access points and/or Voice over Internet Protocol (VoIP) phones. Security devices 120A and 120B may be embodied, for example, as a switch or a router or may be incorporated in network devices such as a switch or a router. Network interfaces 130A and 130B may facilitate one-directional or bi-directional wired and/or wireless communication to and from security devices 120A and 120B. Storage devices 150A and 150B may be non-transitory. Ports 160A-160D may be, for example, electrical ports such as Ethernet, which may include Power over Ethernet (PoE) (i.e., supporting PoE, PoE plus and/or ultra-PoE standards), conductive ports (e.g., using RS-232 standards and/or token ring architecture) and/or radiative ports (e.g., using Wi-Fi technology or Bluetooth standard). The ports may include cages for Small form-Factor Pluggable transceiver (SPFs). Alternatively, the ports may include built-in optical ports. The SPFs or optical ports may be equipped with Optical Time Domain Reflectometers (OTDRs) that may be used for measurements. The ports may have data flow measurements capabilities as well. For example, a security device may include eight RJ45 Ethernet 10 or 100 or 1000 Megabits per second electrical ports.

In some embodiments, the disclosed network security system may include one or more security devices. Each security device may be coupled with one or more network appliances. Each security device may include one or more ports, one or more hardware processors and one or more storage devices. In some embodiments, the disclosed network security system may be used to protect more than one network. In such a configuration, the network security system may include at least one security device for each network.

Figure 2:
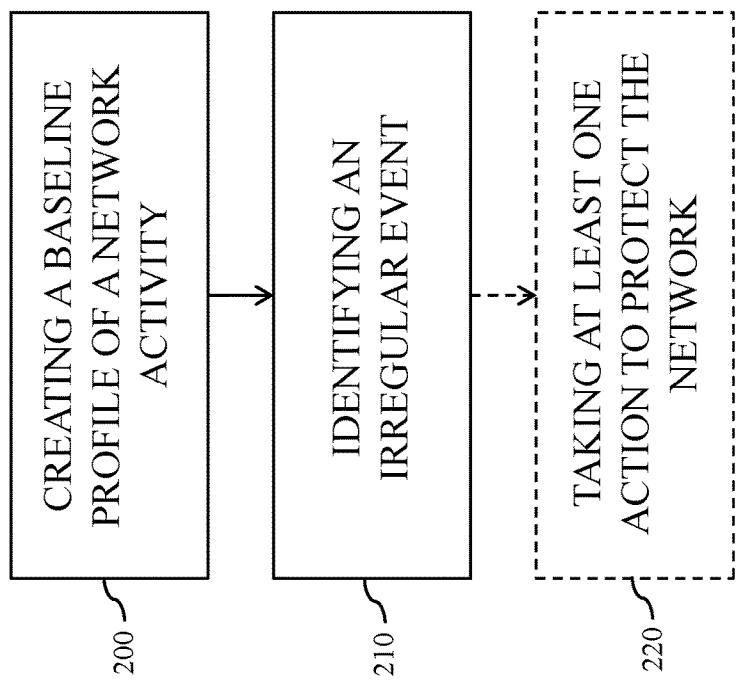
FIG. 2 shows a flowchart of a method for protecting a network, constructed and operative in accordance with an embodiment of the disclosed techniques.

Reference is now made to FIG. 2, which shows a flowchart of a method for protecting a network, constructed and operative in accordance with an embodiment of the disclosed techniques. The network may include a plurality of networked appliances. Each of the networked appliances may be operatively coupled with a different port of a plurality of ports.

In a step 200, a baseline profile of an activity of the network may be initially created. The network activity may be in (i.e., incoming) and/or out (i.e., outgoing) network activity. The baseline profile may include baseline values for various provided, inquirable and/or measurable characteristics of the network, including characteristics representing the network architecture and topology (e.g., number, identification and location of network appliances and other network elements), characteristics of the network appliances (e.g., the power which is drawn by a network appliance, inbound and outbound traffic generated by a network appliance and its characteristics) and/or of other network elements such as cables and fibers (e.g., cable length, fiber length, fiber reflections and/or fiber attenuation). The characteristics are such that a change in the inquired or measured values of these characteristics may indicate that the network is under a physical or a cyber-attack.

In a step 210, following an activation of a protection mode, an irregular event may be identified by detecting a deviation of traffic of the network passing through a port from the baseline profile. Once the protection mode is activated, the ports may be continuously monitored in order to detect such deviations. The irregular events may be identified according to a predetermined set of rules and according to the network defaults. For example, a confirmation of a detected deviation may be required in order to determine that an irregular event is taking place and in order to prevent false alarm. Such a confirmation may be in the form of additional measurements.

In an optional step 220, upon the identification of an irregular event, at least one action may be taken to protect the network. Configured security policies may dictate the course of action if such an irregular event is identified.

Once a deviation from the baseline value is detected (i.e., beyond the error range), the system may take an action or engage in a set of actions, according to the specific action configuration of the system. Optionally, the action configuration may be set by the user. In some embodiments, the system may be configured to perform additional measurements in order to confirm an abnormal measurement and prevent false alarms. For example, the system may be configured to receive irregular results in three consecutive measurements before it takes action.

The actions which may be taken by the system, once an irregular event is detected or confirmed may include generation of an event log (e.g., by using syslog or Simple Network Management Protocol trap), issuing an alert, disabling the port, blocking the communication from and/or to a specific network appliance, and/or sending suspicious data with respect to the irregular event for further analysis in an external dedicated system.

In case a port is disabled, a link to the port may be restored only after the baseline profile or the relevant value of the profile which the network deviated from, is set again.

Network security system 100 of FIG. 1 may operate in accordance with the method of FIG. 200. The method steps may be executed by hardware processors 140A-140C.

The network may be of various architectures and configurations, as known in the art. The disclosed security systems may be coupled with the network core through their connection with the network appliances. In some embodiments, the security devices may include a dedicated port which may be used for uplink connection to the network core.

Various examples for various embodiments of the disclosed network protection are disclosed herein below.

Optical Fibers

In some embodiments, the ports may include optical SFPs equipped with OTDRs. The network traffic through the SFP ports may be monitored for physical measurements and/or cyber measurements. The physical measurements may relate to an optical fiber (or simply a fiber) which is coupled with the port, and may include length, reflections, received power, transmit power, attenuation, etc. The cyber measurements may relate to data flow information such as bytes sent and/or received, Virtual Local Area Networks (VLAN), Media Access Control (MAC) addresses, Internet Protocol (IP) addresses, layer four service ports, and the like.

The actions that the system may perform if an irregular event is identified may include logging of a suspected event or isolation of a threat by disabling the port, e.g., by changing the administrative state of the port to the state of "Disabled".

In some embodiments, one security device, at one side of an optical fiber, may be designated as the master and thus may perform the policy enforcement (e.g., the action configuration) in addition to measurements. The other security device, at the other side of the optical fiber, may then be designated as the slave and therefore may only perform the measurements and then relay the measurement information to the master using a signaling protocol. Such a configuration may increase the reliability of the system due to the ability to double check the measurements and provide measurements from both side of the optical fiber. This configuration may be useful, for example, when multiple cuts are performed in the optical fiber or in a two wires transmission system.

Fiber Length

The SFP OTDR may be periodically (for example, every five seconds) queried (e.g., via an Inter-Integrated Circuit (I2C) interface) for reflections detected in the fiber while the link is up or down. The reflections may be generated, for example, by an end of the fiber (e.g., the original end of the fiber, which is typically the farthest, or an end formed by a cut) or by objects (e.g., connectors and splitters) or a splice or bending formed along the fiber). The query period may be determined by a user of the security system. The SFP OTDR may be provided with a list of up to a limit of detected reflections at various distances from a port. Typically, the largest number received may represent the fiber length and the rest of the numbers may denote other reflections on the fiber such as connectors, bending, splices etc. Such a list may be added to the baseline profile of the network.

In some embodiments, a fiber may be coupled with two security devices, each at each side. The fiber length may be then measured by both sides of the link (i.e., formed by the fiber) and using a signaling protocol such as Link Layer Discovery Protocol (LLDP) the security devices may signal one to the other their individual detected fiber length. This may allow double-checking of the fiber's length measurements and provide more comprehensive information (e.g., in case the fiber is cut in two places).

The baseline value of the fiber length may be set according to an initial measurement. The system may then monitor for any variations in the fiber length compared to the baseline value.

The measurements of the fiber length may vary with respect to the baseline value due to measurement errors. An acceptable error range may be set, optionally by a user of the system, in order to prevent false alarm. For example, a threshold of ten meters may be set. Optionally, the error range may be adjusted and fine-tuned by the user according to the specific environment on site.

Power Reading and Attenuation Change

The security device may monitor the power received by the fiber while the link between the security device and the network is up. The SFP OTDR may be periodically queried for the received power. For example, a default value of five seconds may be predefined for the period of querying (i.e., each five seconds) and optionally, may be redefined by a user. The query may be performed, for example, via an I2C interface.

A change in the power readings may indicate a change in the fiber attenuation. In normal fiber behavior, such changes may occur due to physical reasons such as day and night temperature change that occurs over a relatively long period of time. However, abrupt changes over a short period of time may indicate of an abnormal situation such as a fiber bend or attempt to tamper and tap to the fiber optic. An abnormal or irregular behavior may be detected if a predefined threshold was exceeded. Optionally, several consecutive measurements (e.g., three) of the received power may be read and an abnormality may be identified if the threshold has been exceeded in at least two of the last measurements. In such a case, the system may take actions to address this issue.

In some embodiments, the received power may be measured by security devices which are connected to the fiber, each at a different side of it, while a signaling protocol such as LLDP may be used by the security devices to signal one another their measurements of the received power. In such a configuration, the reliability of the system may increase due to its ability to double check the measurements with respect to the fiber and from each side of it. Such a configuration may be useful, for example, when the fiber is cut at multiple locations or when a two fibers transmission system is used (i.e., one fiber for transmitting and the other for receiving). In such a configuration, the security device may consider the relative change in the measurements since different absolute values may be received by different security devices.

Small changes in the received power over time are acceptable and occur normally. However, a sudden abrupt change in the received power may indicate of a change in the fiber attenuation and therefore may be identified an irregular event pointing at possible tamper attempt with the fiber in a physical attack scenario.

Thus, changes of less than a preset threshold, e.g., 1 dB, over a short period of time, e.g., 15 seconds, may denote that an abnormal event has occurred. Using such thresholds and values is aimed at preventing false alarms. False alarms may occur due to normal causes such as variations in the readings due to natural causes such as slow temperature changes between day and night. Optionally, the readings may be double checked before identifying an abnormal event. The above values of the threshold and the period of time may be adjusted and fine-tuned by a user subject to the specific environment on site.

Electrical Cables

In some embodiments the security device may include one or more electrical ports. The network traffic through the electrical ports may be monitored in order to perform physical and cyber measurements. Physical measurements may relate to an electrical cable length, short circuits, ends state (open or closed) etc. Cyber measurements may relate to data flow information such as bytes sent and/or received, VLANs, MAC addresses, IP addresses, layer 4 service ports, and the like.

The electrical cable may be, for example, a copper cable. The electrical cable may include a plurality of wires, for example, two or four pairs of wires, while one or two pair may be used for transmitting and the other one or two pairs may be used for receiving. An electrical port may be queried periodically for the electrical cable measurements while the link between the security device and the network is up or down. For example, the electrical port may be queried every five seconds by default via an I2C interface. The time period may be reconfigured by a user of the system. The length measurement may be performed by using various methods which are known in the art, such as the industry common practice of time domain reflectometer. The measurements may relate, for example, to a length of a pair of wires and/or to a state of a pair of wires (e.g., Terminated (OK) or Close or Cross-pair short or abnormal cross pair coupling).

The electrical cable length and/or state baseline values of the baseline profile may be set according to some initial measurements. The electrical port may be then monitored for any deviation in the electrical cable length or state with respect to the baseline values.

A default value for the error in the cable length measurements may be set (e.g., three meters) in order to prevent false alarms. This value may be adjusted and fine-tuned by the user subject to the specific environment on site.

Network Appliances Power Supply

In some embodiments, the security device may include one or more ports with power supply support, such as PoE. In such embodiments the security device may also supply power to associated network appliances.

The security switch may then monitor network traffic passing through the power supply supported ports for, e.g., power drawn by the network appliances which are coupled with these supported ports.

If an irregular event is identified, the system may take actions which may include logging of the irregular event or isolation of the threat by disabling the port at which the threat was identified.

The power supply of a network appliance may be periodically queried for the power usage drawn by the network appliance while it is fed. For example, it may be queried every five seconds by default, via an I2C interface for example. This default value may be reconfigured by a user.

The normal behavior of a network appliance with respect to its power consumption is well known. For example, a fixed camera that is always on has a stable power usage. The power usage of a pan, tilt and/or zoom camera may change from a minimal usage during a static rate to a higher usage during movement of the camera, and within a known range of values. Exceeding such known values may indicate of the possibility of an attempt to replace the legitimate security appliance with a rogue one such as a laptop with the purpose of feeding fake video for example. Hence, change in the power usage may lead to the conclusion that the network is under attack by a device that behaves differently than expected in terms of power usage.

A range of minimum and maximum power usage may be preset (optionally by a user) and added to the baseline profile of the activity of the network. The security device may then monitor for any deviations in the power usage with respect to the set range. Those values are appliance depended and therefore may be set according to the values provided by the specific appliance vendor. A small margin, typically of 0.25 Watts, may be added to each end of the provided range as error margins, to prevent false alarms. These values can be adjusted and fine-tuned by the user subject to the specific equipment and environment on site.

Network Appliances

In some embodiments, the security device may serve as an access point for its associated network appliances, coupling these network appliances with the network. Thus, the security device may further include a network port which provides an uplink to a core of the network. The network appliances which are associated with the security device may communicate one with the other and with the rest of the network via the uplink connection. The uplink may be configured in various manners as known in the art. Such configuration may allow the security device to monitor all of the network inbound and outbound traffic to and from its associated network appliances.

Optionally, the monitoring of the network traffic may be selective, such that no significant processing power may be required. In addition, the monitoring may be passive (i.e., passive tapping) such that the traffic may flow through the security device uninterrupted and the network performance may not be affected by the monitoring and analysis operations.

Thus, for example, a portion of the network traffic passing through each port of the security device may be acquired for purposes of analysis of characteristics of the associated network appliances.

Traffic Acquisition

An acquisition algorithm may be employed in the selection of a traffic portion per port to be analyzed. The proposed exemplary acquisition algorithm may allow inspection on the one hand and may prevent starvation of ports on the other hand. The proposed acquisition algorithm is based on methodology which is well known to those skilled in the art.

The overall processing capacity is a known function of a Central Processing Unit (CPU) performance. This number is defined by maximum frames per second (FPS).

A user may select which ports to monitor. The number of ports may be stored as a number of ports parameter.

The monitored ports may be ordered according to their generated traffic load from low to high according to measurements performed in a previous interval.

The algorithm may be based on the assumption that low traffic ports (i.e., having a low traffic load) may pose a higher risk of network attacks than higher traffic ports (i.e., having a higher traffic load). Therefore, the available processing power, i.e., number of frames per second, may be awarded to the monitored ports according to their load order from low to high in such a fashion that the low ports may be inspected in full. Ports which generate high traffic load may be awarded only a portion of the processing capability and such that a sufficient inspection is performed (i.e., in order to detect irregular events).

This calculation is performed per each sampling interval, which may be set, for example, by default to one second, and optionally may be changed by a user.

The proposed acquisition method is based on the security device capabilities such as sFlow using a factor, Access Control Lists (ACLs), traffic policing, etc. These methods may be implemented in the security device as non-intrusive functions, thus not affecting the traffic flow.

A table that depicts the acquisition algorithm operation for an exemplary case of 1,000 frames per second processing capacity and five ports. 'FPS' may represent the number of frames per second measured in the previous interval. 'Inspect' may represent the desired number of frame to be analyzed in the next interval.

| Port | FPS | Inspect |
| --- | --- | --- |
| 1 | 0 | 0 |
| 2 | 30 | 30 |
| 3 | 300 | 300 |
| 4 | 1,000 | 335 |
| 5 | 10,000 | 335 |

Network Appliances

In some embodiments, each selected port may be monitored for inbound traffic generated by the network appliances coupled with the specific port. Each network appliance associated with a selected port, may be identified by its associated port and an identifier of the network appliance, such as its MAC address. Optionally, the network appliance may be identified by additional identifiers, such as VLAN, network appliance type and/or profile and IP address. Each such combination (i.e., a port and at least one identifier of an associated network appliance) which generates inbound traffic in the port may be considered as a new network appliance and thus may be registered in a list of allowed new network appliances. Such a list may be stored in the storage device and may be added to the baseline profile of the network. The first time such a network appliance is detected in the port and the last time it is seen may be stored (e.g., in the storage device).

The user may mark or manually add network appliances to the list. Any network appliance which is detected and is not in the list may be then regarded as a forbidden network appliance.

A security policy with regard to detected forbidden network appliances may be defined per port, optionally by a user. The security policies may dictate the course of action is such cases which may include: logging of the irregular event, isolation of the threat by disabling the port and/or counter attack with scenarios such as Address Resolution Protocol (ARP) poisoning.

The security device may monitor the traffic in the selected ports and upon detection of a forbidden network appliance it may enforce the security policy rule per the specific port, for example by disabling the port.

In case a link to a port is down (i.e., the port does not receive any signals), all the allowed network appliances which are associated with this port and were active may be now designated as disconnected. These network appliances may be suspected as being subjected to a tamper attempt.

In case an active network appliance is not generating traffic for a period of time the network element may be designated as silent. The time period may be set by default to five minutes, for example, and optionally may be reset by a user. This network appliance may be suspected as being subjected to a tamper attempt.

An appropriate course of action may be taken, e.g., by a user of the network, according to which the forbidden network appliance may be deleted or allowed. If the port was disabled, the user may enable the port in order to renew the traffic flow of that port.

Network Appliance Behavior

In some embodiments, the selected ports may be monitored for inbound traffic generated by the network appliance coupled with the specific port.

The selected ports may monitor traffic characteristics such as change in the network utilization, traffic volume, silent port, errored traffic, invalid packet structure in all layers, invalid packet address, change in traffic direction and/or toggling link status. A list of allowed behaviors of network appliances may be generated. The list of allowed network appliances behaviors may be stored, e.g. in the storage device, for persistency, and may be added to the baseline profile of the network. The user may mark or manually add allowed network appliances behaviors to the list. Thus, any detected network appliance behavior that is not in the list may be regarded as a forbidden network appliance behavior.

If the configured minimum or maximum network utilization of a network appliance is exceeded, it may indicate of a change in the normal behavior and therefore may be regarded as an irregularity. For example, a high-definition (HD) 1080P/2MP 30 frames per second Motion JPEG is expected to generate around 12 Megabytes per second (Mbps). Measuring network utilization of 3 Mbps may imply that the camera was replaced by another unauthorized network appliance.

If network appliances configured minimum or maximum traffic volume per a period of time (e.g., one hour) is exceeded, it may indicate of a change in the normal behavior and therefore may be regarded as an irregularity. For example, Simple Network Management Protocol (SNMP) traffic of a network appliance is expected to generate around 200 Kilobit (Kb)/hour. Measuring traffic volume of 3 Megabit (Mb) may imply that this device might be under a mapping attack by another unauthorized network appliance.

If network appliances do not generate any traffic within its configured minimum period of time (e.g., five minutes), it may indicate of a change in the normal behavior and therefore it may be regarded as an irregularity. For example, Supervisory Control and Data Acquisition (SCADA) network appliance is expected to transmit temperature measurements every minute. If any transmission from this network element is not received during a period of five minutes, it may imply that this device is under a Denial of Service (DoS) attack by an unauthorized network appliance.

If network appliances generate errored traffic that exceed the configured maximum frame error rate (e.g., Cyclic Redundancy Check (CRC) error with frame error rate of one error per minute), it may indicate of a change in the normal behavior and therefore may be regarded as an irregularity. For example, VoIP phone which generates traffic with an error rate of 100 errors/second implies that this device might be compromised and is instructed to generate malicious traffic aimed to interfere with the normal network functioning or exploit a vulnerability to sensible to errored frames.

If network appliances generate invalid structured packets that exceed a configured maximum invalid packet structure rate (for example, IP header version 10 with one error per minute rate), it may indicate of a change in the normal behavior and it may therefore be regarded as an irregularity. For example, Wi-Fi access point which generates traffic with a 100 invalid structured packets per second rate may imply that this appliance might be compromised and might be instructed to generate malicious traffic aimed to interfere with the normal network or servers functioning or exploit vulnerability sensible to invalid structured packets.

If network appliances generate invalid address packets that exceed a configured maximum invalid packet address rate (for example, Ethernet source MAC address is broadcast, e.g., ff:ff:ff:ff:ff:ff, with rate of one error per minute), it may indicate of a change in the normal behavior and may be regarded as an irregularity. For example, Wi-Fi access point which generates traffic with a rate of 100 invalid address packets per second, may imply that this appliance might be compromised and might be instructed to generate malicious traffic aimed to interfere with the normal network or servers functioning or exploit a vulnerability sensible to invalid structured packets.

If network appliances exceed a configured minimum or maximum bound percentage of the total traffic per a period of time (e.g., 15 minutes), it may indicate of a change in the normal behavior and may be regarded as an irregularity. For example, traffic of a network element is expected to be 10% inbound. Measuring inbound traffic of 60% percentage may imply that this appliance might be under an http attack by another unauthorized network appliance.

If network appliances cause frequent link state changes of up and down that exceed a configured maximum disk state change rate (e.g., one per day), it may indicate of a change in the normal behavior and may be regarded as an irregularity. For example, small cell network element which generates a rate of 10 link state changes per minute may imply that this device might be compromised and might be instructed to generate network events aimed to interfere with the normal network functioning or exploit a vulnerability sensible to link state changes.

A security policy per port with regard to detected forbidden network elements appliances behavior may be determined, e.g., by a user. The security policies may dictate the course of action in such cases, which may include taking actions such as: logging of the irregular event, isolation of the threat by disabling the port and/or counter attack with scenarios such as ARP poisoning.

In case a link to a port is down, all the allowed network appliances behavior associated with this port that were active may be designated as disconnected. This may provide indication that a network appliance that is expected to be active is now disconnected from the network and is regarded as an irregularity that may indicate of a tamper attempt on this network appliance.

In case an active network appliance is not generating traffic for a period of time (for example, for five minutes by default) the network appliance behavior may be designated as silent. This may provide indication that a network appliance is regarded as an irregularity that may indicate a tamper attempt on this network appliance.

An appropriate course of action may be taken, such as of allowing or deleting the forbidden network appliance, optionally by a user. In case the port was disabled, the port may be enabled for renewing the traffic flow of that port, optionally by a user.

Mute Ports

In this setup a link on a port is brought up but there is no traffic on the port within an initial period (e.g., five minutes). This port may be considered mute as it may be suspected as being under a cyber-attack of reconnaissance and mapping.

Therefore, mute port monitoring may be performed. A security policy may be determined per port with regard to mute ports, optionally by a user. The security policies may dictate taking actions such as logging of the irregular event, isolation of the threat by disabling the port and/or counter attack with scenarios such as ARP poisoning. In case the port was disabled, only after the user clears the alarm the link to the port may be restored.

Network Flow

In some embodiments, the network port may be used (additionally or alternatively) to monitor network flows. Optionally, a portion of the network traffic passing through each port of the security device may be acquired for purposes of analysis by the processing unit. The traffic portion may be selected according to the acquisition algorithm detailed herein above.

A network flow may include traffic between any set of network appliances and such as MAC addresses, VLANs, IP addresses, protocol, service port number or Uniform Resource Locator (URL) address. A network flow may be displayed to a user, for example, as follows:

VLAN: 100
Source:
MAC address: 02:03:04:05:06:07
IP Address: 192.168.10.20
Protocol: UPD
Port: 3000
Destination:
MAC address: 02:03:04:55:55:55
IP Address: 10.20.30.40
Protocol: UPD
Port: 5555

In order to monitor network flows, at least some of the ports may be monitored for inbound and outbound traffic generated by or destined to a network appliance associated with the specific ports.

In the monitored ports, any new network flow detected may be registered and regarded as forbidden. A first time a network flow is detected and the last time it is seen may be stored.

The user may mark or manually add network flows to a list of allowed network flows. The list of allowed network flows may be stored and added to the baseline profile of the network. Thus, any detected network flow that is not in the list may be regarded as a forbidden network flow.

A security policy may be defined per port, optionally by a user, with regard to detected forbidden network flows. The security policies may dictate taking actions such as logging off the irregular event, isolation of the threat by disabling the port and/or counter attack with scenarios such as ARP poisoning.

A forbidden network flow may be allowed or deleted, optionally by the user. In case the port was disabled, the port may be enabled, optionally by the user, in order to renew the traffic flow of that port.

Fibers

In some embodiments, the system may include at least two security devices. Each security device may be operatively coupled with a network, for example, by means of electrical or optical interface. The two security devices are operatively coupled with each other by at least two optical fibers. For example, each of the security devices may include two optical SFPs with a build-in OTDR. One optical fiber may function as the working fiber and the second one as the protecting fiber. By default, traffic may flow on the working fiber, however, in case of a network event such as link failure due to an attack attempt on the working fiber, the traffic may be switched over to the protecting fiber. According to the system configuration (optionally by a user), traffic may be automatically or manually switched back to the working fiber once it is in an upstate again.

The security devices may monitor both the physical and the cyber domains for possible attacks and network events on the fibers.

Physical attack attempts may be identified by irregular events such as sudden change in the receive power due to attenuation change, fiber length change, optical reflections changes etc. These events may be regarded as security breach attempts and may be dealt by the system by means of disabling the port until the user clears the situation.

The fiber protection may be implemented individually per fiber as detailed herein above with respect to securing an optical fiber.

Data Flow

An exemplary method for data flow protection is disclosed herein below. Using spanning tree protocol, the working fiber port may be assigned a lower path cost (e.g., 100) while the protection fiber port may be assigned a higher path cost (e.g., 1,000). This may assure that the network will automatically prefer the working fiber, but will switch to the protection fiber, in case the working fiber fails.

The protecting security device may monitor the links and may apply a function of a redundancy mode. The redundancy mode may be defined, optionally by the user, as one of the following modes: auto, failover not revert, force working, force protection, slave or disabled.

In the auto mode, in normal operation, the working fiber may be active and may carry traffic. The protection fiber may be in standby mode and the system is protected.

This normal mode may be employed when both fibers may carry traffic, while the preferred fiber is the working fiber, including the case when it failed and then restored.

The fiber links may be operational (i.e., link up in normal working state) or not operational (link down, for example due to cable disconnect or link shutdown following a fiber security event as detailed herein above with respect to optical fiber security).

In case the protection fiber is shut down due to a security event it may be re-enabled only after the alarm state is cleared, optionally by a user. The traffic may be still carried by the working fiber but the system may be left unprotected.

In case the working fiber is down the traffic may be failed over to the protection fiber (if operational) but the system may be left unprotected. Once the working fiber link is up again the traffic may be automatically switched back to the working fiber so that the system may resume protection.

In case the working fiber is shut down due to a security event it may be re-enabled only after the alarm state is cleared, optionally by the user. The traffic is still carried by the protection fiber (if operational) but the system is unprotected.

In case both links are not operational, the system may be in failure mode and no traffic may be carried.

In the failover, not revert mode, in normal operation, the working fiber may be active and may carry traffic while the protection fiber may be in standby mode and the system may be protected.

This normal mode may be employed when both fibers may carry traffic, the preferred fiber is the working fiber but in case it fails it may be regarded as compromised thus traffic will not be automatically revered to it. The protecting fiber is the only fiber that may be used until the situation of the working fiber is evaluated and reverts to it, optionally by the user.

The fibers links may be operational (link up in normal working state) or not operational (link down, for example due to cable disconnect or link shutdown following a fiber security event as detailed herein above with respect to optical fiber security).

In case the protecting fiber is down, the traffic may be still carried by the working fiber but the system may be left unprotected. Once the protection fiber link is up again, the system resumes protection.

In case the protection fiber is shut down due to a security event it may be re-enabled only after the alarm state is cleared, optionally by the user. The traffic may be still carried by the working fiber but the system may be left unprotected.

In case the working fiber is down, the traffic may be failed over to the protection fiber (if operational) but the system may be left unprotected. Once the working fiber link is up again, the traffic may be reverted to the working fiber, optionally manually, and the system may resume protection. Until then the system may be unprotected.

In case the working fiber is shut down due to a security event it can be re-enabled only after the user clears this alarm state. The traffic is still carried by the protection fiber (if operational) but the system is unprotected.

In case both links are not operational, the system may be in failure mode and no traffic may be carried.

In the force working mode, in normal operation, the working fiber may be active and may carry traffic, but the protection fiber may be shut down and the system may be left protected.

The working fiber link may be operational (link up therefore normal working state) or not operational (link down, for example due to cable disconnect or link shutdown following a fiber security event as detailed herein above with respect to the optical fiber security).

In case the protection fiber is down, the system may be in failure mode and no traffic may be carried.

In case the protection fiber is shut down due to a security event, it may be re-enabled only after the alarm state is clarified, optionally by the user. The system may be in failure mode.

In the force protection mode, in normal operation, the protecting fiber may be active and may carry traffic, but the working fiber may be shut down and the system may be left protected.

The protection fiber link may be operational (i.e., link up and normal working state) or not operational (i.e., link down due to cable disconnect or link shutdown following a fiber security event as detailed herein above with respect to optical fiber security).

In case the protection fiber is down, the system may be in failure mode and no traffic may be carried.

In case the protection fiber is shut down due to a security event, it may be re-enabled only after the alarm state is cleared, optionally by the user. The system may be in failure mode.

In the slave mode, all the decisions are made by the master. Signaling may be used to convey measurements from the slave to the master as detailed herein above with respect to optical cable security.

In a disable mode, the function may be disabled and the ports act in a standard fashion.

Configuration Freeze

In some embodiments, the security device may include a push button which may be used to control the remote management functionality of the security device. In some embodiments, the push button may be hidden. Optionally, the security device may further include a lock Light Emitting Diode (LED) in order to indicate the mode of the security device. These features may provide security and protection for the security device itself.

The security device may allow, by default, remote management and configuration.

Once the configuration and provisioning process of the security device is concluded, there is no further need for any change of the configuration. Thus, in this phase the security device may be locked for remote changes by pushing the button once or by a remote command via the network, a Command-Line Interface (CLI) or Simple Network Management Protocol (SNMP).

In this new locked mode, the security device may not perform any configuration action until the push button is physically pressed and the lock is released. In the locked mode, the lock LED on the front panel may be switched on. For example, all SNMP set commands, web posts and CLI configuration may be blocked. Only read functions may be enabled. Exceptions to the above may be functions that may not affect the configuration such as changing the discrete output state. Such functions may remain active even when the security device is in a lock mode.

Once the security device is up and running in normal mode, it may monitor the push button state. The block mode may be achieved by performing various operations, which may be configured per security device. Some examples for such operations are detailed herein below.

Any configuration changes by web interface, by disabling relevant Hypertext Transfer Protocol (HTTP) post commands to the relevant URLs may be blocked;

Any configuration changes by SNMP interface, by disabling SNMP SET commands to the relevant Object IDentifiers (OIDs) in the Management Information Base (MIB), may be blocked;

Any configuration changes by CLI (serial or ssh/telnet) by disabling the relevant configuration commands may be blocked;

The lock LED may be turned on;

The push button state may be continuously monitored when in lock mode. Unlocking may be performed by physically pushing the button again, thus toggling the state.

The security device may then, for example, unblock configuration changes by web interface, by enabling relevant http post commands to the relevant URLs. The security device may unblock configuration changes by SNMP interface, by enabling SNMP SET commands to the relevant OIDs in the MIB. The security device may unblock configuration changes by CLI (serial or ssh/telnet) by enabling the relevant configuration commands. The lock LED may be then turned off.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A network security system for a network, the network comprising a plurality of networked appliances selected from the group consisting of cameras, sensors, access control devices, Voice over Internet Protocol (VoIP) phones, computers, servers, network interface adapters, network switches, and routers, the security system comprising one or more security devices, wherein each security device of the one or more security devices is associated with one or more networked appliances of the plurality of networked appliances, and wherein each security device comprises:
   a network interface comprising one or more ports, wherein each networked security appliance of the one or more networked appliances associated with the security device is operatively coupled with the security device via a different port of the ports;
   at least one hardware processor configured to:
      upon initial setup of said security device, create a baseline profile of the network comprising
         (i) network data traffic, and
         (ii) network physical characteristics comprising at least some of: identity of said networked appliances, location of said networked appliances, electric power usage of said networked appliances, length and state of one or more electric power cables of said network, state of electric circuits of said network, length and state of one or more data cables of said network, length of one or more optical fiber cables of said network, reflections of said one or more optical fiber cables of said network, attenuation of said one or more optical fiber cables of said network, number of connections of said one or more optical fiber cables of said network, bending of said one or more optical fiber cables of said network, and splices of said one or more optical fiber cables of said network, and
      following an activation of a protection mode, identify an irregular event by detecting a deviation of at least one of network data traffic and network physical characteristics from said baseline profile.

2. The network security system of claim 1, wherein upon the identification of an irregular event, said at least one hardware processor is further configured to take at least one action to protect the network and wherein the at least one action is selected from the group consisting of: generating an event log, issuing an alert, disabling the port, logging off the irregular event, performing a counter attack, blocking the communication from or to one or more network appliances of the plurality of network appliances, and sending data with respect to the irregular event for further analysis in an external dedicated system.

3. The network security system of claim 1, wherein:
   at least one network appliance of the plurality of network appliances is coupled with a port of the ports by an optical fiber,
   the baseline profile includes the length of the optical fiber, and
   the ports comprise Small form-Factor Pluggable transceivers (SFPs) equipped with Optical Time Domain Reflectometers (OTDRs), wherein the SFPs are used to monitor the optical fiber for reflections, and wherein the reflections represent a length of the optical fiber.

4. The network security system of claim 1, wherein:
   at least one network appliance of the plurality of network appliances is coupled with a port of the ports by an optical fiber,
   the baseline profile includes an attenuation of the optical fiber, and
   the ports comprise SFPs equipped with OTDRs, wherein the SFPs are queried for the power received from the optical fiber, and wherein a change in the power received from the optical fiber indicates a change in the attenuation of the optical fiber.

5. The network security system of claim 1, wherein:
   the ports comprise at least one electrical port,
   at least one network appliance of the plurality of network appliances is coupled with the electrical port by an electrical cable,
   the baseline profile includes a length and a state of the electrical cable, and the hardware processor is further configured to monitor the electrical port for the length and state of the electrical cable.

6. The network security system of claim 1, wherein:
the ports comprise one or more ports with a power supply support;
a network appliance of the plurality of network appliances is coupled with a port with power supply support of the one or more ports with a power supply support, wherein the port with power supply support supplies power to the network appliance,
the baseline profile includes a power usage of the network appliance, and
the hardware processor is further configured to monitor the port with a power supply support for the power usage of the network appliance.

7. The network security system of claim 1, wherein:
a security device of the one or more security devices further comprises a network port configured to couple the one or more network appliances associated with the security device with the network,
the baseline profile includes characteristics of the plurality of network appliances, and the hardware processor is further configured to:
 select one or more ports from the ports of the security device,
 monitor the network data traffic passing through the selected one or more ports for inbound network data traffic generated by network appliances of the one or more network appliances coupled with a the selected one or more ports indicative of the characteristics of the network appliances, and
 acquire a portion of the network data traffic passing through each port of the selected one or more ports, wherein the monitoring in each port of the selected one or more ports is performed with respect to the acquired portion of the network data traffic.

8. The network security system of claim 1, wherein:
a security device of the one or more security devices further comprises a network port configured to couple the one or more network appliances associated with the security device with the network,
the baseline profile includes a list of allowed network flows, and
the hardware processor is further configured to:
 select one or more ports from the ports,
 monitor each selected one or more ports for network flows in inbound and outbound network data traffic generated by network appliances coupled with the selected ports, and
 acquire a portion of the network data traffic passing through each port of the selected one or more ports, wherein the monitoring in each port of the selected one or more ports is performed with respect to the acquired portion of the network data traffic.

9. The network security system of claim 1, wherein at least one security device of the one or more security devices further comprises a push button configured to control the remote management and configuration of the at least one security device.

10. The network security system of claim 1, further comprising a first security device and a second security device coupled with an optical fiber at two opposing sides of the optical fiber, and wherein:
the first security device is designated as a master and performs policy enforcement on the network, and
the second security device is designated as a slave and is configured to:
 perform measurements on the network data traffic, and
 relay the measurements to the first security device.

11. A method for protecting a network, the network comprising a plurality of networked appliances selected from the group consisting of selected from the group consisting of cameras, sensors, access control devices, Voice over Internet Protocol (VoIP) phones, computers, servers, network interface adapters, network switches, and routers, wherein each of said plurality of networked appliances is operatively coupled with a different port of a plurality of ports, the method comprising using at least one hardware processor for:
 initially creating a baseline profile of the network comprising
  (i) network data traffic, and
  (ii) network physical characteristics comprising at least some of: identity of said networked appliances, location of said networked appliances, electric power usage of said networked appliances, length and state of one or more electric power cables of said network, state of electric circuits of said network, length and state of one or more data cables of said network, length of one or more optical fiber cables of said network, reflections of said one or more optical fiber cables of said network, attenuation of said one or more optical fiber cables of said network, number of connections of said one or more optical fiber cables of said network, bending of said one or more optical fiber cables of said network, and splices of said one or more optical fiber cables of said network; and
 following an activation of a protection mode, identifying an irregular event by detecting a deviation of at least one of network data traffic and network physical characteristics from said baseline profile.

12. The method of claim 11, further comprising using said at least one hardware processor for taking at least one action to protect the network upon the identification of an irregular event, wherein the action is selected from the group consisting of: generating an event log, issuing an alert, disabling the port, logging off the irregular event, performing a counter attack, blocking the communication from or to one or more network appliances of the plurality of network appliances, and sending data with respect to the irregular event for further analysis in an external dedicated system.

13. The method of claim 11, wherein:
at least one network appliance of the plurality of network appliances is coupled with a port of the ports by an optical fiber,
the baseline profile includes the length of the optical fiber, and
the ports further comprise SFPs equipped with Optical Time Domain Reflectometers (OTDRs), and
wherein the method further comprises using said at least one hardware processor for utilizing the SFPs to monitor the optical fiber for reflections, and wherein the reflections represent a length of the optical fiber.

14. The method of claim 11, wherein:
at least one network appliance of the plurality of network appliances is coupled with a port of the ports by an optical fiber,
the baseline profile includes an attenuation of the optical fiber, and the ports further comprise SFPs equipped with OTDRs, and
wherein the method further comprises using said at least one hardware processor for querying SFPs for the power received from the optical fiber, and wherein a change in the power received from the optical fiber indicates a change in the attenuation of the optical fiber.

15. The method of claim 11, wherein:

the ports comprise at least one electrical port, at least one network appliance of the plurality of network appliances is coupled with the electrical port by an electrical cable, the baseline profile includes a length and a state of the electrical cable, and wherein the method further comprises using said at least one hardware processor for monitoring the electrical port for the length and state of the electrical cable.

16. The method of claim 11, wherein:

the ports comprise one or more ports with a power supply support;

a network appliance of the plurality of network appliances is coupled with a port with power supply support of the one or more ports with a power supply support, wherein the port with power supply support supplies power to the network appliance, and the baseline profile includes a power usage of the network appliance, and wherein the method further comprises using said at least one hardware processor for monitoring the port with a power supply support for the power usage of the network appliance.

17. The method of claim 11, wherein:

the ports comprise a network port configured to couple the plurality of network appliances with the network, and the baseline profile includes characteristics of the plurality of network appliances, and wherein the method further comprises using said at least one hardware processor for:

selecting one or more ports from the ports, monitoring each selected one or more ports for inbound network data traffic generated by one or more network appliances of the plurality of network appliances coupled with the selected one or more ports indicative of the characteristics of the one or more network appliances, and acquiring a portion of the network data traffic passing through each port of the selected one or more ports, wherein the monitoring of the inbound network data traffic generated by the one or more network appliances is performed with respect to the acquired portion of the network data traffic.

18. The method of claim 11, wherein:

the ports comprise a network port configured to couple the plurality of network appliances with the network, and the baseline profile includes a list of allowed network flows, and wherein the method further comprises using said at least one hardware processor for:

selecting one or more ports from the ports, monitoring each selected one or more ports for network flows in inbound and outbound network data traffic generated by one or more network appliances of the plurality of network appliances coupled with the selected one or more ports, and acquiring a portion of the network data traffic passing through each port of the selected one or more ports, wherein the monitoring of the inbound network data traffic generated by the one or more network appliances is performed with respect to the acquired portion of the network data traffic.

19. The method of claim 11, further comprises using said at least one hardware processor for controlling the remote management and configuration of the ports.

* * * * *